United States Patent [19]

Tybus et al.

[11] 4,081,413

[45] * Mar. 28, 1978

[54] POLYVINYL CHLORIDE COMPOSITIONS

[75] Inventors: Axel W. Tybus, New York; Leonard A. Fabrizio, North Bellmore, both of N.Y.

[73] Assignee: Hooker Chemicals & Plastics Corporation, Niagara Falls, N.Y.

[*] Notice: The portion of the term of this patent subsequent to Dec. 30, 1992, has been disclaimed.

[21] Appl. No.: 644,966

[22] Filed: Dec. 29, 1975

Related U.S. Application Data

[63] Continuation-in-part of Ser. No. 465,403, Apr. 29, 1974, Pat. No. 3,929,700.

[51] Int. Cl.$^2$ ............................................. C08L 91/00
[52] U.S. Cl. .......................... 260/23 XA; 260/30.6 R; 260/31.2 R; 260/31.8 M
[58] Field of Search ................... 252/48.4; 260/23 XA

[56] References Cited

U.S. PATENT DOCUMENTS

| | | | |
|---|---|---|---|
| 3,046,237 | 7/1962 | Rosenfelder | 260/23 |
| 3,075,940 | 1/1963 | Pazanski | 260/31.8 |
| 3,218,289 | 11/1965 | Rowland | 260/31.8 |
| 3,277,042 | 10/1966 | Richard | 260/31.8 |
| 3,313,760 | 4/1967 | Barnes | 260/31.8 |
| 3,670,056 | 6/1972 | Helberger | 260/23 XA |
| 3,678,133 | 7/1972 | Ryan | 260/23 XA |
| 3,906,943 | 9/1975 | Arluck et al. | 128/90 |
| 3,929,700 | 12/1975 | Tybus et al. | 260/23 XA |

OTHER PUBLICATIONS

Matthews, G. "Vinyl and Allied Polymers" CRC Press (1972), vol. 2, pp. 73–81, 87–92, 117–119, 129 & 130.
Penn, A. S. "PVC Technology" (1966) pp. 48–52, 156, 186 & 187.
Sanetuick HA "Polyvinyl Chloride" (1969), pp. 67–71 & 88–100.

*Primary Examiner*—Lewis T. Jacobs
*Attorney, Agent, or Firm*—Peter F. Casella; James F. Mudd

[57] ABSTRACT

Polyvinyl chloride compositions comprising per 100 parts by weight of polyvinyl chloride, about 0.7 to 14 parts of a polyvinyl chloride plasticizer, about 4 to 25 parts of an impact-modifier, about 1 to 3 parts of a processing aid, and about 1 to 3 parts of at least one lubricant. The compositions are preferably stabilized with a total of about 6 and 9 parts of stabilizer and stabilizer booster combination. The compositions are formable with finger pressure at temperatures above a minimum forming temperature for each specific composition. Said minimum forming temperature is preferably between about 120° F and 160° F.

16 Claims, No Drawings

POLYVINYL CHLORIDE COMPOSITIONS

This application is a continuation-in-part application of application Ser. No. 465,403 filed Apr. 29, 1974 given Pat. No. 3,929,700 and issue date of Dec. 30, 1975.

This invention provides polyvinyl chloride compositions having desirable properties.

SUBJECT MATTER OF THE INVENTION

The present invention provides improved polyvinyl chloride (sometimes referred to as "PVC") compositions containing about 0.7 to 14 parts of plasticizer per 100 parts of polyvinyl chloride, about 4 to 25 parts of an impact modifier and about 1 to 3 parts of a processing aid. The compositions also contain about 1 to 3 parts of lubricants, and about 6 to 11 parts of polyvinyl chloride stabilizers and stabilizer boosters, which preferably comprise about 0.8 to 3 parts stabilizer and about 5 to 8 parts of stabilizer booster. The stabilizers and stabilizer boosters are preferably in an amount of about 6 to 7.5 parts. The compositions usually also contain pigments in an amount up to about 5 parts. All the foregoing proportions are expressed per 100 parts by weight of polyvinyl chloride.

These polyvinyl chloride compositions are capable of being formed into sheet material, e.g., plastic sheet between about 40 and 250 mils thick, having the following properties: a tensile strength at yield of above 2,000 psi, e.g. between 2,000 and 10,000 (preferably 5,000 – 8,000) psi, an elongation at yield of between 3% and 30% (preferably 4%-8%), a flexural strength of between 3,000 and 14,000 (preferably 8,000–12,000) psi, a flexural modulus of between about $0.5 \times 10^5$ and $7 \times 10^5$ (preferably $2 \times 10^5$–$5 \times 10^5$) psi, a notched Izod of between 0.3 and 30 (preferably 0.5-15) foot pounds per inch of notch, a Rockwell hardness of between 75 and 110 on the R scale (preferably 90-100), and a Vicat softening point of between 60° C (140° F) and 80° C (176° F). The compositions in sheet form soften when heated above a minimum forming temperature so that they may be formed by finger pressure. This minimum forming temperature is broadly within the range of 120° F–160° F. This forming temperature is determined by two different methods. The plastic sheet can be heated in a water bath and the softening temperature determined, e.g., by the method described hereinafter. The plastic sheet when heated until soft at an elevated temperature, e.g., above 200° F, is then cooled in air and the temperature at which it stiffens determined as set forth in Example 1.

The polyvinyl chloride is a polymer having a number average molecular weight (NAMW) preferably of about 15,000 to 40,000. Polymers having number average molecular weights of about 17,000 to 32,000 and particularly 20,000 to 30,000 are more preferred; with those within the range of 20,000-26,000 most preferred.

The plasticizers are those plasticizers used for polyvinyl chloride resins. The preferred plasticizers are the phthalates, e.g., di (2-ethylhexyl) phthalate also commonly referred to as dioctyl phthalate, and such other phthalates as di-butyl phthalate, butyl decyl phthalate, butyl benzyl phthalate, diisooctyl phthalate, and the like. The di (2-ethylhexyl) phthalate is particularly preferred. Other useful plasticizers include the phosphates such as tri-2-ethylhexyl phosphate, and tricresyl phosphate; the adipates, e.g., di-butyl adipate, dihexyl adipate, dioctyl adipate; the corresponding sebecates; and the trimellitates, such as the butyl, and octyl; and the like. The preferred compositions contain di(2-ethylhexyl) phthalate, preferably in an amount of about 8 parts, per 100 of polyvinyl chloride. The PVC compositions preferably contain about 3 to 10 parts and more preferably about 7.5 to 8.5 parts of plasticizer, with about 8 parts considered optimum in the preferred compositions.

The preferred PVC impact modifiers are methylmethacrylatebutadiene-styrene (MBS) type polymers, acrylonitrile-butadiene-styrene (ABS) type polymers and chlorinated polyethylene; the MBS being particularly preferred. Other PVC impact modifiers include ethylene-propylene copolymers, ethylene-vinyl acetate copolymers, ethyl acrylate and butyl acrylate elastomers, butyl rubber, butadiene-styrene rubber, butadiene elastomers, propylene oxide rubber, urethane elastomers, chlorinated polyethylene, and polyester elastomers. All of these impact modifiers are polymers with rubbery characteristics.

The impact modifiers are preferably used in an amount of about 8 to 16 parts, and more particularly 10–14 parts, with about 12 parts considered optimum in the preferred PVC compositions. When the polyvinyl chloride polymer has a number average molecular weight of 15,000–20,000, then at least 12 parts of impact modifier should be used.

Polyvinyl chloride processing aids are used in an amount of about 1 to 3 parts, preferably about 1.5 to 2.1 parts, and more preferably in an amount of about 1.8 parts. The preferred processing aid is an acrylic-type polymer, such as those marketed under the trade designations Rohm & Haas K-120 N and Kanegafuchi PA 20.

The stabilizers are those known to stabilize polyvinyl chloride against heat and light degradation. These include the metal salts of fatty acids and particularly those of calcium, zinc, tin, barium and magnesium, and the di-organo-tin compounds. The preferred stablizers are those stabilizers sanctioned for use in food packaging applications by the Food and Drug Administration and include the stearates and certain dioctyl tin (IV) compounds including dioctyl tin bis-iso-octylmercaptoacetate, the maleate, and the like. The stablizers are used in an amount of about 0.8 to 4 parts, and preferably between 0.8 to 3 parts. The preferred stabilizer combination consists of calcium stearate, zinc stearate, and stannous stearate. The amount of the combination of said three stabilizers is about 0.8 to 1.1 parts. The preferred amount of said stabilizers is about 1 part per 100 parts polyvinyl chloride.

The polyvinyl chloride stabilizer boosters include phosphites, epoxidized oils, and polyvinyl alcohol. The diand tri (nonylphenyl) phosphites, epoxidized oils (particularly epoxidized soybean oil), and polyvinyl alcohol are preferred. The stabilizer boosters are preferably in an amount of about 5 and 6.5 parts.

Polyvinyl chloride homopolymer and impact modifier copolymer blends are relatively difficult materials to process by the conventional processing techniques, including milling and calendering and extruding. Polyvinyl chloride lubricants are provided in amounts of about 1 to 3 parts, and preferably about 1 ¼ to 2 parts, with about 1.5 parts being particularly preferred. Known polyvinyl chloride lubricants include mineral oil, fatty acids, synthetic waxes of the fatty amide and ester types, octyl stearate, calcium stearate; the corresponding citrates and citrate esters, particularly the citrate esters of medium, e.g., starting at about 10 carbon atoms and long-chain carboxylic acids. The glyceride esters and particularly those of the medium and long-chain saturated and unsaturated carboxylic acids and the hydrogenated medium and long-chain carboxylic acids are useful lubricants. Some of these known lubricants and particularly the stearates and citrate esters also have a stabilizing effect and are therefore preferred for at least a portion of the lubricant content of the composition. The preferred lubricants are glycerides, citrates, and hydrogenated carboxylic acids.

Other adjuvants and conventional materials used in polyvinyl chloride plastic compositions, such as ultraviolet stabilizers, coloring agents, pigments, and the like, can be used. The amount of such materials and particularly the pigments is up to about 5 parts and preferably are about 2.5 to 3.5 parts. Titanium dioxide and various organic colors are commonly employed as pigments. Pigments are not necessary when color is not important or colorless (clear) plastics desired.

The more preferred compositions of the present invention together with the composition of Example 1 follow:

TABLE I

| COMPONENTS | Preferred Range (parts) | Preferred Composition (parts) |
| --- | --- | --- |
| PVC homopolymer resin (20,000 - 26,000 NAMW) | 100 | 100 |
| impact modifier (methyl-methacrylate-butadiene-styrene polymer) | 10 - 14 | 12.0 |
| processing aid (acrylic type-graft terpolymer of methyl-methacrylate and butadiene-styrene polymer) | 1.5 - 2.1 | 1.8 |
| lubricant blend of olefinic monoglyceride and hydrogenated olein | 1 - 1.5 | 1.25 |
| tri-stearyl citrate | 0.25 - 0.35 | 0.3 |
| plasticizer (di-2-ethyl-hexyl phthalate) | 7.5 - 8.5 | 8.0 |
| stabilizer boosters epoxidized soybean oil | 4 - 6 | 5.0 |
| mixed di- and tri-nonyl-phenyl phosphite | 1.25 - 1.75 | 1.5 |
| polyvinyl alcohol | 0.05 - 0.08 | 0.0675 |
| stabilizers calcium stearate | 0.24 - 0.30 | 0.27 |
| stannous stearate | 0.37 - 0.43 | 0.40 |
| zinc stearate | 0.28 - 0.34 | 0.31 |
| pigments | 2.5 - 3.5 | |
| rutile grade $TiO_2$ | | 3.25 |
| Hosterperm Red | | 0.0054 |
| Indofast Orange | | 0.0135 |

The invention is illustrated in the following examples. All parts and percentages specified throughout this specification and claims are by weight, unless indicated otherwise.

EXAMPLE 1

A polyvinyl chloride composition was prepared having the composition exemplified in the righthand column of the table hereinbefore. The polyvinyl chloride resin and an admixture of the three stabilizers are added gradually to a mixer of the Henschel type, while the mixer is agitating. The resin and stabilizers are added in proportions approximately corresponding to their respective proportions in the exemplified composition in the table. When the desired total quantity of the resin and stabilizers has been added and mixed, the corresponding proportions of the remaining ingredients are added during agitation to prepare a homogeneous mixture. The homogeneous mix is then fed to an extruder and then extruded in the form of a cylindrical solid and cut into small pellets ⅛ inch × 3/16 inch. The pellets are then used to form sheet material by being extruded in the form of a rope-shaped material of a diameter about ½ to about 3 inches which is then milled in rollers and calendered into sheet about 15-20 mills thickness. Five sections of such sheet were laminated together in a press with a heated die to form sheets about 80-90 mils thick.

Samples of the plastic were tested and determined to have an average tensile strength at yield of about 7,550 psi and at rupture of about 3,800 psi. (ASTM D-638.) The average percent elongation at yield was about 5% and the average percent elongation at rupture was 14.2%. The average flexural strength was $10.8 \times 10^3$ psi and the flexural modulus was $4.1 \times 10^5$ psi (ASTM D-790.). The Vicat softening point (ASTM D-1525-70) for the aforesaid plastic layer was 163° F (+2° being the usual precision of the test procedure). This is a 5 mil penetration at 136° F up to a 40 mil penetration at 163° F. The physical properties were determined upon dumb-bell-shaped specimens. These are produced by injection molding in a laboratory specimen-producing machine. The small pellets described hereinbefore are the feed to the injection molding machine.

When cooled in air from 85° C (185° F), a sheet of about 80 mils thickness exhibits the relationship between cooling time and the Shore D hardness and temperature set forth in the following table:

| Time (minutes) | Temperature ° C | Shore D Hardness |
| --- | --- | --- |
| 0 | 85 | — |
| 1 | 71 | 33 |
| 2 | 61 | 48 |
| 3 | 53 | 62 |
| 4 | 48 | 67½ |

When samples of the sheet, for example, 80-90 mils thick, were heated to temperatures of in excess of 200° F, for example, 260°-270° F, and allowed to cool in air, it was found that the plastic sheet is formable at elevated temperatures and remains formable when subjected to finger pressure until cooled to about 129-130° F. At this temperature it hardens or stiffens sufficiently so that it was no longer moldable under finger pressure and thereafter retains its shape unless reheated. Subsequently other samples nominally having the same composition but subjected to different processing conditions which included inclusion of recycled plastic, were found to have somewhat lower formable temperatures, for example, 123°-125° F.

The plastic sheet material produced from the compositions of this example are uniquely suited for utilization as and in orthopedic devices.

EXAMPLE 2

In this example and the following examples, the plastic composition was prepared and samples were tested in the same manner as in Example 1 unless otherwise noted. The same composition was used as in Example 1 except that six parts of the plasticizer were used in place of the eight parts of Example 1.

EXAMPLE 3

The same composition was used as in Example 1 except that ten parts of the plasticizer were used in place of the eight parts of Example 1.

EXAMPLE 4

The same composition was used as in Example 1 except that twelve parts of chlorinated polyethylene were used as the impact modifier in place of the MBS impact modifier of Example 1.

EXAMPLE 5

The same composition was used as in Example 1 except that 16 parts of chlorinated polyethylene were used as the impact modifier in place of the 12 parts of MBS of Example 1.

The compositions of Examples 6–11 are set forth in Table II. The physical properties for these examples which were determined using the aforenoted procedure are set forth in Table III.

TABLE II

| COMPONENTS | Examples | | | | | |
|---|---|---|---|---|---|---|
| | 6 | 7 | 8 | 9 | 10 | 11 |
| PVC homopolymer resin | | | | | | |
|   24,000 NAMW | 100 | 100 | 100 | — | — | 100 |
|   30,000 NAMW | — | — | — | — | 100 | — |
|   19,000 NAMW | — | — | — | 100 | — | — |
| impact modifier (methyl-methacrylate-butadiene-styrene polymer) | 12 | 8 | 18 | 12 | 12 | 12 |
| processing aid (acrylic type-graft terpolymer of methyl-methacrylate and butadiene-styrene polymer) | 1.8 | 1.8 | 1.8 | 1.8 | 1.8 | 1.8 |
| lubricant | | | | | | |
| blend of olefinic mono-glyceride and hydrogenated olein | 1.25 | 1.25 | 1.25 | 1.25 | 1.25 | 1.25 |
| tri-stearyl citrate | 0.3 | 0.3 | 0.3 | 0.3 | 0.3 | 0.3 |
| plasticizer (di-2-ethyl-hexyl phthalate) | 3 | 8 | 8 | 6 | 10 | 8 |
| stabilizer boosters | | | | | | |
| epoxidized soybean oil | 5.5 | 5.5 | 5.5 | 5.5 | 5.5 | 5.5 |
| mixed di- and tri-nonyl-phenyl phosphite | 2 | 2 | 2 | 2 | 2 | 2 |
| polyvinyl alcohol | 0.067 | 0.067 | 0.067 | 0.067 | 0.067 | 0.067 |
| stabilizers | | | | | | |
| calcium stearate | 0.27 | 0.27 | 0.27 | 0.27 | 0.27 | 0.27 |
| stannous stearate | 0.4 | 0.4 | 0.4 | 0.4 | 0.4 | 0.4 |
| zinc stearate | 0.31 | 0.31 | 0.31 | 0.31 | 0.31 | 0.31 |
| pigments | | | | | | |
| rutile grade $TiO_2$ | 3 | 3 | 3 | 3 | 3 | 3 |

TABLE III

| Example | 2 | 3 | 4 | 5 | 6 | 7 | 8 | 9 | 10 | 11 |
|---|---|---|---|---|---|---|---|---|---|---|
| tensile strength psi | 6,283 | 5,585 | 5,711 | 5,862 | 6,651 | 6,183 | 6,267 | 5,840 | 5,127 | 5,976 |
| % elongation | 5.6 | 5.4 | 5.0 | 4.8 | 5.7 | 5.8 | 5.3 | 5.4 | 5.4 | 5.4 |
| tensile modulus $\times 10^5$ psi | 3.43 | 3.20 | 3.45 | 3.38 | 3.6 | 3.5 | 3.07 | 3.34 | 3.04 | 3.4 |
| flexural strength | 10,658 | 10,827 | 11,732 | 9,396 | 11,449 | 10,972 | 9,615 | 10,532 | 9,575 | 10,486 |
| flexural modulus psi | 484,626 | 368,198 | 386,532 | 354,981 | 394,564 | 372,206 | 339,555 | 364,251 | 334,844 | 362,449 |
| Izod impact ft. lbs./inch of notch | 6.5 | 4.8 | 2.4 | 9.4 | 10.6 | 0.70 | 9.6 | 1.8 | 6.8 | 4.6 |
| Vicat softening point °F | 159.4 | 155.8 | 156.6 | 154.9 | 171.5 | 158.9 | 160.3 | 157.1 | 169.3 | 158.5 |
| Rockwell hardness "R" scale | 98.2 | 94.6 | 83.3 | 77.7 | 99.3 | 98.1 | 85.5 | 95.0 | 89.9 | 94.8 |
| heat - °F deflection (ASTM-D-648-72) | 114.4 | 111.2 | 115.3 | 115.3 | 122.0 | 110.8 | 112.6 | 112.1 | 107.2 | 109.9 |

The forming temperature for the plastic sheet was also determined by a softening test. A water bath is assembled containing two aluminum bars 1 inch × 1 inch × the approximate length of the bath. These bars are placed eight (8) inches apart and parallel to each other lengthwise on the bottom of the bath. Specimens are 2 inches × 10 inches × 80 mils. They were prepared by first making, on the mill, sheets of a thickness of 45 mils. Two sheets were laminated in a press to form the 80 mil sheet. These specimens are supported perpendicularly on and between the aluminum bars. The water level is set 1 inch above the test specimens. The temperature of the water bath is increased at a rate of approximately 1° C every 2 minutes, temperature being constantly indicated by a mercury thermometer suspended in the bath at the same level as the specimens. When the specimens start to sag between the aluminum bars, one is removed and immediately twisted lengthwise 180° and then immediately bent 90° at the center of the specimen. The total time of forming must be no more than 5 seconds. This procedure is conducted at room temperature. The specimen is held in this position for one minute and then placed on a table and released. The degree to which the specimen maintains the shape or unfolds is the indication of its affinity to maintain its shape at that water bath temperature. After evaluation of the initial specimen, new specimens are removed from the water bath at 1° C intervals and identically evaluated for shape retention until a specimen completely retains the complex shape with no indication of desire to return towards any part of its original shape. The temperature at which the specimen maintains the completely distorted shape is recorded as the Softening Point (by water bath). The Softening Point for the compositions of Examples 1-12 are reported in Table IV.

TABLE IV

| Example | Softening Point | |
|---|---|---|
| | °C | °F |
| 1 | 60 | 140 |
| 2 | 62 | 144 |
| 3 | 57 | 135 |
| 4 | 61 | 142 |
| 5 | 61 | 142 |
| 6 | 66 | 151 |
| 7 | 61 | 142 |
| 8 | 62 | 144 |
| 9 | 62 | 144 |
| 10 | 60 | 140 |
| 11 | 60 | 140 |
| 12 | 69 | 156 |

The stiffening point test described in Example 1 is believed to correlate more closely to service conditions of the plastic sheet as an orthopedic device. The stiffening point range is broadly between about 120° F and 150° F, with compositions having a stiffening point above about 129°-130° F being preferred. The corresponding softening point range is broadly about 130°-160° F, although the correlation between the two tests is not necessarily linear. It is noted that the softening point determined for the composition of Example 1 is 140° F and the stiffening point determined for the same composition is 129°-130° F.

The limits for the various components of the polyvinyl chloride compositions of the present invention are determined by the sometimes conflicting requirements of materials necessary to obtain the desired physical properties and also necessary to permit processing into the desired form.

The plastic compositions of this invention are particularly useful in the production of orthopedic devices such as those disclosed in U.S. Pat. No. 3,906,943, the disclosure thereof being incorporated herein by this reference.

While the invention has been described above with respect to specific components and embodiments, it should be clear that various modifications may be made thereto within the spirit and scope of the inventive concept as defined in the appended claims.

We claim:

1. A polyvinyl chloride composition which is formable at elevated temperatures and is a shape-retaining solid at room temperatures and which is capable of being formed into a plastic sheet having the following properties.
    a tensile strength at yield of above about 2,000 psi, an elongation at yield of between 3% and 30%, a flexural modulus of between about $0.5 \times 10^5$ and $7 \times 10^5$ psi, a notched Izod of between 0.3 and 30 foot pounds per inch of notch, a Rockwell hardness of between 75 and 110 on the R scale, and a Vicat softening point of between 60° C and 80° C, comprising
    100 parts by weight of polyvinyl chloride,
    about 0.7 to 14 parts of a polyvinyl chloride plasticizer,
    about 4 to 25 parts of a polyvinyl chloride impact-modifier,
    about 1 to 3 parts of a polyvinyl chloride processing aid,
    about 1 to 3 parts of at least one polyvinyl chloride lubricant,
    at least one polyvinyl chloride stabilizer and at least one polyvinyl chloride stabilizer booster in an amount between about 6 and 11 parts of said stabilizer and stabilizer booster.

2. The composition of claim 1 which also contains up to about 5% of pigments and other polyvinyl chloride adjuvants, between about 0.8 and 4 parts of said stabilizer and between about 5 and 8 parts of said stabilizer booster, and wherein said polyvinyl chloride resin has a number average molecular weight between about 15,000 and 40,000.

3. The composition of claim 3 comprising between about 3 and 10 parts of said plasticizer, between about 8 and 16 parts of said impact-modifier, between about 1.5 and 2.1 parts of said processing aid, between about 1¼ and 2 parts of said lubricant, between about 0.8 and 3 parts of said stabilizer, and between about 5.5 to 6.5 parts of said stabilizer booster.

4. The composition of claim 3, wherein
    said polyvinyl chloride has a number average molecular weight between about 17,000 and 32,000,
    said plasticizer is a phthalate plasticizer,
    said impact-modifier is selected from the group consisting of methylmethacrylate-butadiene-styrene polymer, acrylonitrile-butadiene-styrene polymer, and chlorinated polyethylene,
    said processing aid is an acrylic-type processing aid,
    said lubricant is at least one lubricant selected from the group consisting of glycerides, citrates and hydrogenated medium and long chain carboxylic acids,
    said polyvinyl chloride stabilizer is in an amount between about 0.8 and 1.1 parts and is at least one metal stearate stabilizer, and
    said stabilizer booster is at least one compound selected from the group consisting of phosphites, epoxidized oils and polyvinyl alcohol.

5. The composition of claim 4 containing as the metal stearate stabilizer, a mixture of calcium stearate, stannous stearate, and zinc stearate; and containing as the stabilizer booster, a mixture of epoxidized soybean oil, mixed di- and tri-nonylphenyl phosphite, and polyvinyl alcohol.

6. The composition of claim 1 which is a shape-retaining solid at room temperatures consisting essentially of
    100 parts by weight of polyvinyl chloride having a number average molecular weight of about 20,000 to 30,000,
    about 7.5 to 8.5 parts of phthalate plasticizer,
    about 10 to 14 parts of polyvinyl chloride impact-modifier,
    about 1¼ to 2 parts of polyvinyl chloride lubricant,
    about 1.5 to 2.1 parts of polyvinyl chloride processing aid,
    about 0.8 to 3 parts of polyvinyl chloride stabilizer,
    about 5 to 6.5 parts of polyvinyl chloride stabilizer booster, said stabilizer booster containing between about 0.05 to 0.08 parts of polyvinyl alcohol, and
    up to about 5 parts of pigment.

7. The composition of claim 6, consisting essentially of
    100 parts by weight of polyvinyl chloride having a number average molecular weight of about 20,000 to 26,000, about 8 parts of plasticizer, about 12 parts of impact modifier selected from the group consisting of methylmethacrylate-butadiene-styrene polymer, acrylonitrile-butadiene-styrene polymer, and chlorinated polyethylene, about 1¼ parts of a blend of oleofinic monoglyceride with hydrogen olein as a lubricant and about 0.3 parts of tri-stearyl citrate lubricant, about 1.8 parts of an acrylic-type processing aid, about 0.27 parts of calcium stearate, about 0.4 part of stannous stearate and about 0.31 part of zinc stearate as the stabilizers, about 5 parts of epoxidized soybean oil, about 1.5 parts of mixed di- and tri-nonylphenyl phosphite, and about 0.0675 part of polyvinyl alcohol, as the stabilizer boosters, and about 2.5 to 3.5 parts of pigments.

8. The composition of claim 1 which is capable of being formed into a plastic sheet having the following properties:

a tensile strength at yield of between about 2,000 and 10,000 psi, and is capable of being formable at temperatures above a minimum forming temperature, said minimum forming temperature being between about 120° F and 160° F.

9. The composition of claim 8 having the following physical properties:

a tensile strength at yield of between 5,000 and 8,000 psi, an elongation at yield of between 4% and 8%, a flexural strength of between 8,000 and 12,000 psi, a flexural modulus of between about $2 \times 10^5$ and $5 \times 10^5$ psi, a notched Izod of between 0.5 and 15 foot pounds per inch of notch, a Rockwell hardness of between 75 and 110 on the R scale, and a minimum forming temperature of about 129°–130° F.

10. The composition of claim 7 having the following physical properties:

a tensile strength at yield of between 5,000 and 8,000 psi, an elongation at yield of between 4% and 8%, a flexural strength of between 8,000 and 12,000 psi, a flexural modulus of between about $2 \times 10^5$ and $5 \times 10^5$ psi, a notched Izod of between 0.5 and 15 foot pounds per inch of notch, a Rockwell hardness of between 75 and 110 on the R scale, and a minimum forming temperature of about 129°–130° F.

11. A polyvinyl chloride composition which is finger formable at elevated temperatures and is a shape-retaining solid at room temperatures comprising 100 parts by weight of polyvinyl chloride, about 0.7 to 14 parts of a polyvinyl chloride plasticizer, about 4 to 25 parts of a polyvinyl chloride impact-modifier, about 1 to 3 parts of a polyvinyl chloride processing aid, about 1 to 3 parts of at least one polyvinyl chloride lubricant, about 0.8 to 4 parts of at least one polyvinyl chloride stabilizer, and about 5 to 8 parts of at least one polyvinyl chloride stabilizer booster containing polyvinyl alcohol.

12. The composition of claim 11 wherein said polyvinyl chloride is a polyvinyl chloride homopolymer resin having a number average molecular weight between about 15,000 and 40,000, and comprises between about 3 and 10 parts of plasticizer, about 8 to 16 parts of impact-modifier, about 1.5 to 2.1 parts of processing aid, about 1 ¼ to 2 parts of lubricant, about 0.8 and 3 parts of stabilizer, and about 5 and 6 ½ parts of stabilizer booster containing polyvinyl alcohol.

13. The composition of claim 12 wherein said polyvinyl chloride homopolymer resin has a number average molecular weight of between about 17,000 and 32,000, and comprising about 7.5 to 8.5 parts of phthalate plasticizer, about 10 to 14 parts of impact-modifier, provided that when the homopolymer resin has a number average molecular weight below about 20,000, the impact-modifier is in an amount of at least about 12 parts, about 0.8 and 1.1 parts of metal stearate stabilizer, and about 4 to 6 parts of epoxidized soybean oil, about 1.25 to 1.75 parts of mixed di- and tri-nonylphenyl phosphite, and about 0.05 to 0.08 part of polyvinyl alcohol, as the stabilizer boosters.

14. The composition of claim 13 wherein said impact-modifier is selected from the group consisting of methylmethacrylate-butadiene-styrene polymer, acrylonitrile-butadiene-styrene polymer, and chlorinated polyethylene, said processing aid is an acrylic-type processing aid, said lubricant is at least one selected from the group consisting of a blend of oleofinic monoglyceride with hydrogen olein and tri-stearyl citrate, said stabilizer is a mixture of about 0.27 parts of calcium stearate, about 0.4 part of stannous stearate, and about 0.31 part of zinc stearate, and said stabilizer booster is a mixture of about 5 parts of epoxidized soybean oil, about 1.5 parts of mixed di- and tri-nonlyphenyl phosphite, and about 0.0675 part of polyvinyl alcohol.

15. The composition of claim 14 wherein said polyvinyl chloride is a homopolymer resin having a number average molecular weight of between about 20,000 and 26,000, and wherein said plasticizer is di-2-ethylhexyl phthalate.

16. The composition of claim 15 wherein said plasticizer is in an amount of about 8 parts, said impact-modifier is in an amount of about 12 parts, said processing aid is in an amount of about 1.8 parts, and said lubricant is in an amount of about 1.5 parts.

* * * * *

UNITED STATES PATENT OFFICE
CERTIFICATE OF CORRECTION

Patent No. 4,081,413            Dated March 28, 1978

Inventor(s) A. W. Tybus et al.

It is certified that error appears in the above-identified patent and that said Letters Patent are hereby corrected as shown below:

At Column 8, line 16, for "claim 3" read "claim 1".

Signed and Sealed this

Nineteenth Day of September 1978

[SEAL]

Attest:

RUTH C. MASON
*Attesting Officer*

DONALD W. BANNER
*Commissioner of Patents and Trademarks*